United States Patent

Million et al.

[11] Patent Number: 6,004,042
[45] Date of Patent: Dec. 21, 1999

[54] MULTI-FIBER CONNECTOR

[75] Inventors: Troy P. Million, Sparta; Richard Z. Jamroszczyk, Somerville, both of N.J.

[73] Assignee: Berg Technology, Inc., Reno, Nev.

[21] Appl. No.: 09/014,551

[22] Filed: Jan. 28, 1998

Related U.S. Application Data

[63] Continuation-in-part of application No. PCT/US96/12396, Jul. 24, 1996
[60] Provisional application No. 60/001,268, Jul. 28, 1995.

[51] Int. Cl.$^6$ .................................................... G02B 6/38
[52] U.S. Cl. ............................................................ 385/59
[58] Field of Search ........................... 385/59–69, 80–90

[56] References Cited

U.S. PATENT DOCUMENTS

| | | | |
|---|---|---|---|
| 4,142,776 | 3/1979 | Cherin et al. | 385/71 |
| 4,305,642 | 12/1981 | Bloodworth, Jr. et al. | 350/96.2 |
| 4,657,341 | 4/1987 | Sammueller | 350/96.22 |
| 4,730,198 | 3/1988 | Brown et al. | 385/89 |
| 4,778,243 | 10/1988 | Finzel | 350/96.21 |
| 4,818,058 | 4/1989 | Bonanni | 350/96.2 |
| 4,836,638 | 6/1989 | Finze | 350/96.21 |
| 4,865,413 | 9/1989 | Hubner et al. | 350/96.21 |
| 4,998,796 | 3/1991 | Bonanni et al. | 350/96.21 |
| 5,006,201 | 4/1991 | Kaukeinen | 156/633 |
| 5,134,673 | 7/1992 | Stephenson et al. | 385/56 |
| 5,155,787 | 10/1992 | Carpenter et al. | 385/98 |
| 5,201,021 | 4/1993 | Delage et al. | 385/114 |
| 5,259,050 | 11/1993 | Yamakawa et al. | 385/59 |
| 5,287,426 | 2/1994 | Shahid | 385/85 |
| 5,367,595 | 11/1994 | Jennings et al. | 385/65 |
| 5,379,361 | 1/1995 | Maekawa et al. | 385/65 |
| 5,388,174 | 2/1995 | Roll et al. | 385/80 |
| 5,402,512 | 3/1995 | Jennings et al. | 385/46 |
| 5,430,819 | 7/1995 | Sizer, II et al. | 385/59 |
| 5,586,211 | 12/1996 | Dumitrou et al. | 385/135 |
| 5,727,097 | 3/1998 | Lee et al. | 385/78 |
| 5,845,026 | 12/1998 | Lee et al. | 385/58 |
| 5,862,281 | 1/1999 | Shahid | 385/78 |

FOREIGN PATENT DOCUMENTS

| | | | |
|---|---|---|---|
| 0 444 347 | 12/1990 | European Pat. Off. | 6/38 |
| 5-060 948 | 9/1991 | Japan | 6/40 |
| 4-338 703 | 11/1992 | Japan | 6/22 |
| 5-060947 | 3/1993 | Japan | 6/40 |

*Primary Examiner*—Akm E. Ullah
*Attorney, Agent, or Firm*—Brian J. Hamilla; Daniel J. Long; M. Richard Page

[57] ABSTRACT

Disclosed is a multifiber optical cable array connector which includes a central block having a plurality of bores that is made up of a lower chip having v-grooves on its upper surface and an upper chip having v-grooves on its lower surface which is superimposed over the lower chip to form the bores. An optical fiber ribbon cable has its insulation removed and the fibers are inserted through every other bore in the block. A second optical fiber ribbon cable similarly has its insulation removed at one end and is superimposed over the first ribbon cable with its fibers being inserted through the remaining bore. Because of this construction substantial numbers of fibers may be received in this connector.

24 Claims, 7 Drawing Sheets

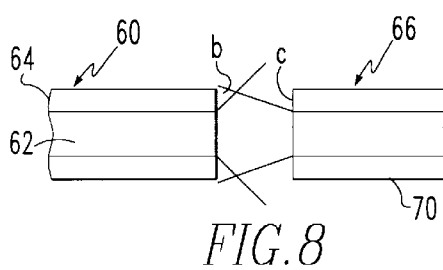
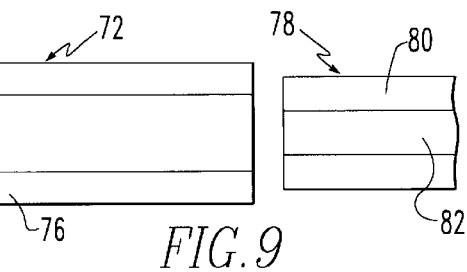
FIG.8  FIG.9
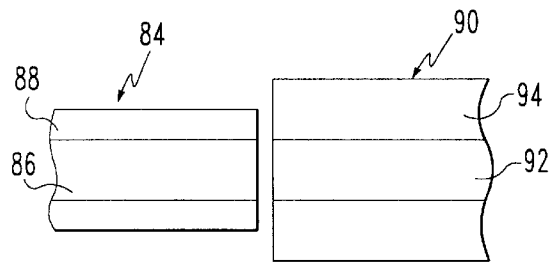
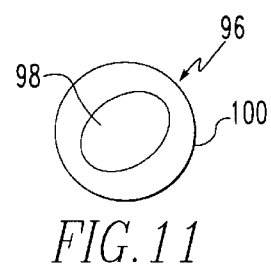
FIG.10  FIG.11
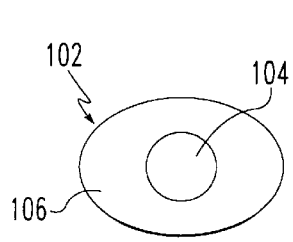
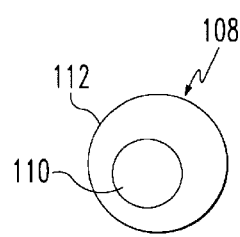
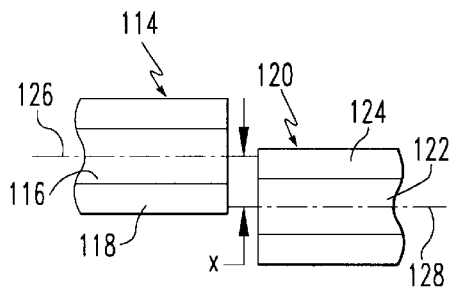
FIG.12  FIG.13  FIG.14
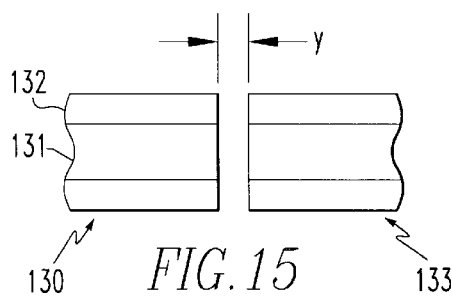
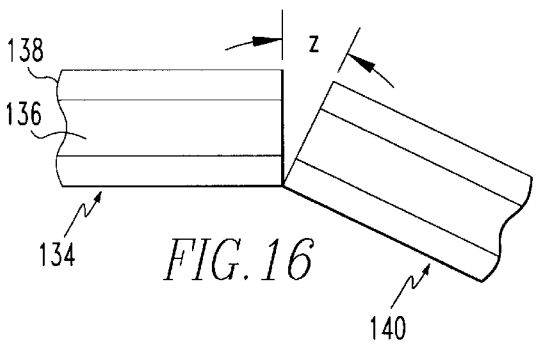
FIG.15  FIG.16
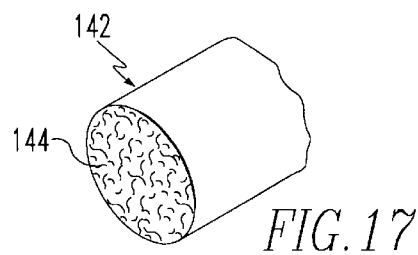
FIG.17

MULTI-FIBER CONNECTOR

CROSS REFERENCE TO RELATED APPLICATION

This is a continuation-in-part of co-pending International Application No. PCT/US96/12396 filed Jul. 24, 1996. Which is a provisional of Ser. No. 60/001,268 filed Jul. 28, 1995.

BACKGROUND OF THE INVENTION

1. Field of the Invention

The present invention relates to optical fiber connectors and, more particularly, to chips for use in connecting optical fiber ribbon cables.

2. Brief Description of Prior Developments

As fiber optics emerged in the mid 1970's, engineers improved data transmission rates to 45 megabits per second over 24 fibers using single fiber connectors. Twenty years later, a 32 fiber parallel array system can transmit 16 Gb/s for computer technology requiring faster transmission rates exceeding the coaxial capacities and lengths. Several array technologies and consortiums have evolved that incorporate the parallel fiber array technology. The list includes Optoelectronic Technology Consortium (OETC) composed of AT&T, IBM, Honeywell and Martin Marietta.

The OETC group has developed a 32 channel optical link by introducing new packaging techniques for the devices and optical fibers. The transmitter and receiver modules were designed to eliminate pigtails by connecting directly to the fiber optic cable assemblies. The fiber density was increased in the devices, connectors and cables by maintaining a tighter pitch between fibers. New test procedures were developed for the 18 fiber test units to address the new 32 fiber cable. The higher density MACII® in the standard connector shell maintains compatibility through existing connector designs.

Conventional MACII® configurations include the 18 and 32 fiber chips. The 18 fiber chips place the fibers on 250 micron centers since the fiber's construction limits the higher densities in a single dimension with the MACII® hardware. The ribbonized fibers (62.5/125/250) core/cladding/buffer dimensions in microns) are placed side by side in a single row. When the 18 fibers are ribbonized in a single layer, 18×1, buffer to buffer, the fiber's centers require 250 micron spacing since the buffers control the linear layout. During the assembly, the buffer material is removed 9.5 millimeters from the fiber end to expose the 125 micron cladding. Though the 18 Fiber MACII® chips house the 125 micron diameters, the 250 buffers space the fibers 250 microns apart. In OETC, MACII® standard parts are used with a 32 fiber chip design. In the 32 fiber chip, a 62.5/125/135 fiber placed on 140 micron centers increased the density. It will be understood that the preferred groove dimensions disclosed in connection with FIGS. 36–38a below will be for the fiber shown in FIG. 35a and that these dimensions will be adjusted for the larger fiber shown in FIG. 38b.

SUMMARY OF THE INVENTION

In the connector of the present invention a central block is formed from an upper and a lower chip, each of these chips having a plurality of longitudinal grooves which form with the other chip a plurality of fiber receiving bores in the block. The top chip is then superimposed over the lower chip and is connected thereto by an adhesive or the like. A insulation is removed from a fiber ribbon cable and inserted in every other v-groove in the lower chip. A second optical fiber ribbon cable is superimposed over the first cable and the insulation removed and the fibers from that upper cable are inserted in the remaining v-grooves. By means of this construction significantly more fibers can be received in a particular pair of adjoining chips, e.g. preferably 16 to 36 fibers and more preferably 36 fibers will be received.

BRIEF DESCRIPTION OF THE DRAWINGS

The connector and method of the present invention is further described with reference to the accompanying drawings in which:

FIGS. 8–17 are various longitudinal and a perspective view of optical fiber connectors illustrating various principles underlying the method and apparatus of the present invention;

DETAILED DESCRIPTION OF THE PREFERRED EMBODIMENTS

Figure 1:
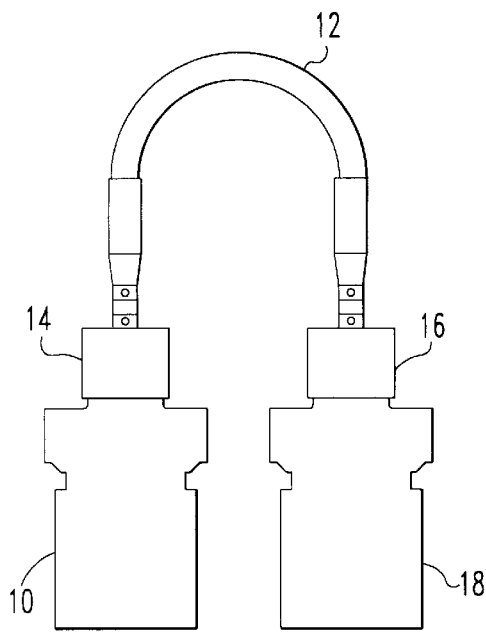
FIG. 1 is schematic illustration of an OETC system in which the connector of the present invention may be used.

Referring to FIG. 1, it will be seen that the basic elements included in an optical data communications system include a transmitter 10, optical cable 12 with connectors 14 and 16, and receiver 18. The transmitter converts the electrical signal to a light signal that travels through the optical cable to the receiver. The receiver converts the optical signal into an electrical signal. Optical connectors in the system ease installation and modifications between the transmitters and receivers.

Figure 2:
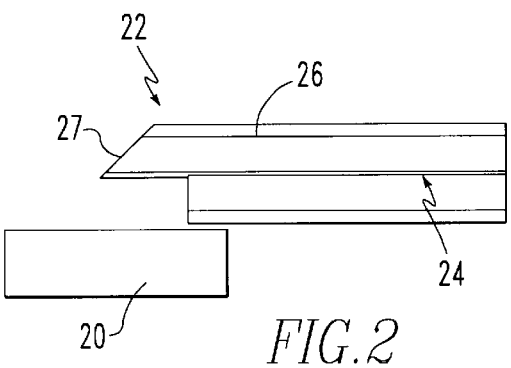
FIG. 2 is a schematic illustration of a VCSEL and array block side view with receiver components.

The transmitters convert the electrical signal into an optical signal through the laser diodes. Conventional designs package the laser in a can that mounts to the board. The board density limits the laser quantities. Referring to FIG. 2 a vertical cavity surface emitting laser (VCSEL) is shown which packages the individual laser diodes into a single modular package conserves board space. This device includes a light emitting diode (LED) 20, a fiber array block shown in fragment generally at numeral 22. The fiber array block includes an optical fiber shown in fragment at 24 and a multifiber array connector (MACII®) chip shown in fragment at 26. The OETC transmitter module packages 32 vertical cavity surface emitting lasers in a single module. The individual lasers launch the light vertically into the fiber array block. The fiber array block rear 27 is polished at a 45° angle and gold plated to reflect the light emitting from the VCSEL into the fiber.

The receivers convert the optical signal into an electrical signal. Traditional designs package the receivers in a can that mounts to the board. The board density limits the receiver module capacity. The OETC group designed a 32 channel detector/receiver array, 31 data channels and one clock channel. The receiver array design resembles the source design incorporating fiber array blocks with a gold plated 45° rear angle to reflect the light exiting the fiber into the individual detectors on 140 micron centers. The fiber link consists of the optical cable assembly with optical connectors terminated to the two cable ends to join the transmitters to the receivers. A single fiber or multiple fibers may form the link.

Figure 3:
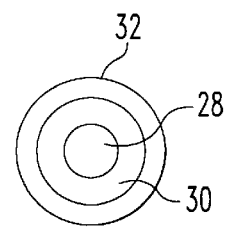
FIG. 3 is a transverse cross sectional view of an optical fiber which may be used in the connector and method of the present invention.

Referring to FIG. 3, the optical fiber consists of three major components forming a single unit. The inner component known as the core 28 is surrounded by a second layer called the cladding 30. To protect the core and cladding from destructive elements, a buffer material 32 is added. The core and cladding materials provide the medium to transmit the light signal. The fiber is classified by its size, type and mode capacity. The fiber sizes consist of two numbers representing the core and cladding diameters in microns. A 62.5/125 fiber signifies a 62.5 micron core surrounded by a 125 micron cladding layer. A third number represents the protective layer covering the cladding known as the buffer in microns. The core, cladding and buffer diameters vary in sizes and configurations according to their performance requirements. The following Table 1 highlights the most popular sizes.

TABLE 1

POPULAR FIBER SIZES

| SIZE | APPLICATION |
| --- | --- |
| 8/125/250 | Single-mode |
| 8/125/500 | |
| 8/125/900 | |
| 50/125/250 | Multimode |
| 50/125/500 | |
| 50/125/900 | |
| 62.5/125/250 | Multimode |
| 62.5/125/500 | |
| 62.5/125/900 | |

TABLE 1-continued

POPULAR FIBER SIZES

| SIZE | APPLICATION |
| --- | --- |
| 100/140/250 | Multimode |
| 100/140/500 | |
| 100/140/900 | |

Figure 4:
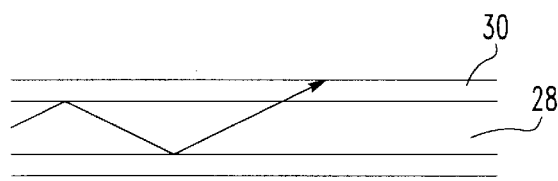
FIGS. 4 and 5 are longitudinal cross sections of optical fibers in which theoretical principles underlying the connector and method of the present invention are illustrated.
Figure 5:
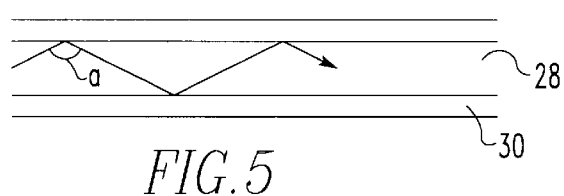

Referring to FIGS. 4–5, a fiber is shown with a core 28 and cladding 30, but without a buffer material. Light reflects down the fiber between the core and cladding barrier following Snell's law, i.e. being refracted toward the higher index of refraction. In the fiber, light is refracted into the fiber core since the core's index of refraction is greater than the cladding index of refraction as is shown in FIG. 4. Referring particularly to FIG. 5, it will be seen that to maintain internal reflection, light must enter the fiber core at the critical angle A, or the light will not reflect into the core.

Figure 6:
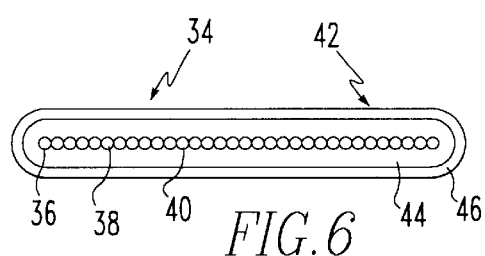
FIGS. 6 and 7 are transverse cross sectional views of fiber optical ribbon cables which may be used with the connector and method of the present invention.

Referring to FIG. 6, the fiber array includes a ribbon shown generally at numeral 34 with a plurality of fibers as at 36, 38 and 40 aligned in a single row. The fiber width results from the summation of the fibers' diameters since the fibers' diameters dictate the fibers' center to center offset. The fiber ribbon also includes sheathing shown generally at numeral 42 which includes a primary ribbon buffer 44 and a secondary ribbon buffer 46. The sheathing protects and maintains the fiber ribbon structure. Tensile loads applied to optical fibers impose negative performance characteristics in the fiber. Strength members surround the ribbon's sheathing relieving the fibers of external tensile loads introduced to the cable.

Figure 7:
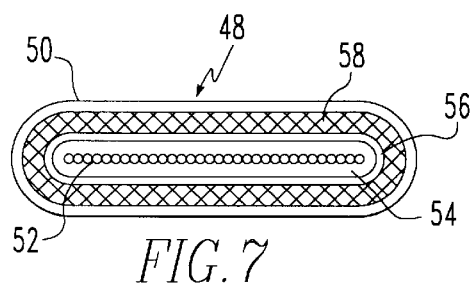

Referring to FIG. 7 another ribbon shown generally at 48 is shown to illustrate its outer jacket 50. Like fiber ribbon 34, fiber ribbon cable 48 includes a central plurality of fibers 52, a primary ribbon buffer 54 and a cable buffer 56. Fiber ribbon cable 48 also includes a strength member 58 which is preferably KEVLAR® available from DuPont and which is interposed between the jacket and the cable buffer. The outer jacket provides environmental protection to the fiber ribbon and strength members. The jacket materials vary according to the application, but the flexible plastics are the most common materials. The plastics' chemistry will vary to meet riser and plenum specifications and requirements.

In long haul applications requiring kilometers of ribbons, the installer will permanently splice the ribbons in series to minimize attenuation through the total length of ribbon. The ribbons and splices remain united without interruption. The optical connectors provide an alternative to the permanent splice allowing the installer to change or vary the ribbon installation at any time. Such optical fiber connectors are designed to join two fibers while minimizing the interconnection loss. Intrinsic and extrinsic loss are the two major loss types of such interconnection loss. Intrinsic loss results from abnormalities in optical fiber's geometry which includes numerical aperture (light acceptance angle) and diameter mismatch, concentricity, ellipticity of the core and cladding. Referring to FIG. 8, loss from numerical aperture mismatch is illustrated in which a first fiber 60 having a core 62 and cladding 64 is attempted to be aligned with a second fiber 66 having a core 68 and cladding 70. It will be observed that in this arrangement there is intrinsic loss resulting from a mismatch in light acceptance angles b and c between fiber 60 and fiber 66. Referring to FIG. 9, fiber 72 has a large diameter core 74 and cladding 76. Fiber 78 has a small diameter core 80 and outer cladding 82. Because of this core diameter mismatch, intrinsic loss will also result. Referring to FIG. 10, fiber 84 has a core 86 and outer cladding 88. Aligned fiber 90 has a core 92 of the same diameter as core 86. The outer cladding 94, however, of fiber 90 has a larger diameter than cladding 88 of fiber 84 thus again resulting in intrinsic loss. Referring to FIG. 11, a fiber 96 is shown with an elliptical core 98 and a cladding 100. This core elliptcity will also result in intrinsic loss. Referring to FIG. 12, a situation is shown where intrinsic loss occurs in a fiber 102 having a circularly cross sectional core 104, but in which there is an elliptical cladding 106. Referring to FIG. 13, still another intrinsic loss situation is illustrated in which fiber 108 has a circularly cross sectional core 110 and a circularly cross sectional cladding 112 but in which the core and cladding are not concentric. Referring to FIG. 14, one situation resulting in extrinsic loss is illustrated in which fiber 114 having a core 116 and cladding 118 is laterally misaligned with fiber 120 which has a core 122 and cladding 124 is laterally offset from fiber 114. It will, in particular, be observed that the center line 126 of fiber 114 is misaligned by a distance x from the center line 128 of fiber 120. Referring to FIG. 15, fiber 130 having a core 131 and cladding 132 is aligned with fiber 133 having a core and cladding corresponding to fiber 130. The ends of these fibers 130 and 133 are separated by a distance y thereby again resulting in extrinsic loss. Referring to FIG. 16, extrinsic loss also results in a situation in which fiber 134 having a core 136 and cladding 138 is misaligned by an angle z from cable 138 having a core and cladding corresponding to fiber 134. Referring to FIG. 17, still another example of an extrinsic loss factor is shown in which fiber 142 has an end with a rough surface 144. The extrinsic loss factors that are considered during the connector design phase include lateral offset, end separation, angular misalignment, and surface finish. The end separation and surface finish are dependent on the polish phase of the manufacturing of the cable assembly.

Figure 18:
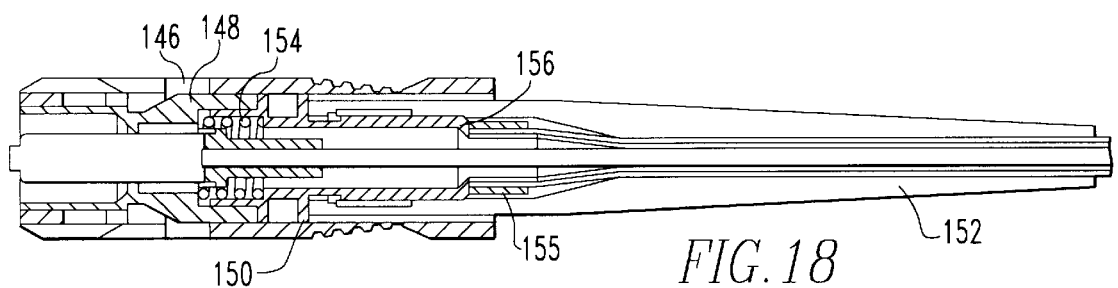
FIG. 18 is a longitudinal cross sectional view of a conventional SC fiber optic connector useful for the purpose of understanding the connector and method of the present invention.

Referring to FIG. 18, an SC fiber optic connector is shown. This connector includes a coupling device 146, a front outer shell 148, a rear outer shell 150 and a boot 152. The device also includes a spring 154, a ring 155 and a clamping ring 156. As is conventional, the connector will also include a ferrule, insert, primary and secondary alignment devices and a strain relief device (all not shown). In a single terminus, the ferrule secures and houses the optical fiber. The insert acts as the central member allowing the ferrule to float within the connector while retaining the coupling mechanism and providing the rough alignment. The insert usually contains the spring that applies the appropriate force to the ferrule. The coupling mechanism attaches the connector and cable assembly to the adjoining optical connector, adapter or device. The strain relief secures the cable's strength members to the connector assembly without interfering with the ferrule's floating ability. The boot will maintain the cable's minimum bend radius at the cable's exit point in the connector.

Figure 19:
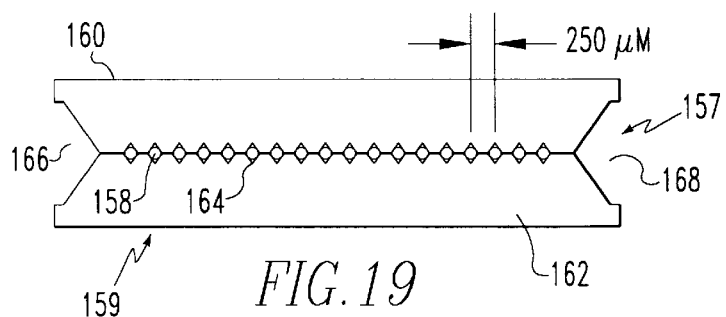
FIGS. 19 and 20 are end views of multifiber array connectors which may be adapted for use with the method of the present invention illustrating fiber to fiber center spacing.

Referring to FIG. 19, a preferred multiple array connector (MACII®) shown generally at numeral 157 reflects the single fiber connector construction, but the array connector aligns several fibers as at 158 simultaneously within a block 159. The MACII® block consists of a pair of silicon chips 160 and 162 with v-grooves as at 164 etched to tight tolerances. The chips sandwich the fibers in the v-grooves bonded with epoxy. Alignment pins (not shown) secured in the deeper end grooves 166 and 168 provide the chip to chip and fiber to fiber alignment. The chips can accommodate a fiber diameter range of 100 to 178 microns since the fiber diameters of the ribbons control the chip spacing. It will be understood that all fibers as, for example, shown in Table 1 must be stripped of the buffer as part of the assembly process. The 18 Fiber MACII® chips place the fibers on 250 micron centers; the fiber's buffer diameter limits the spacing between the fibers.

Figure 20:
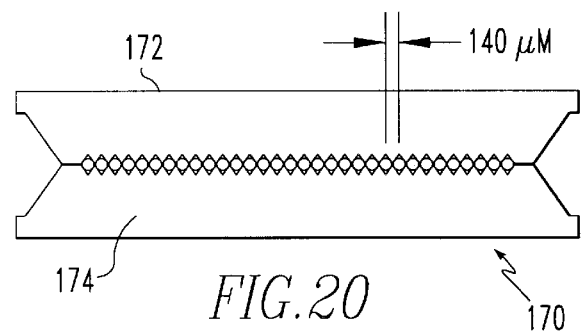
Figure 21:
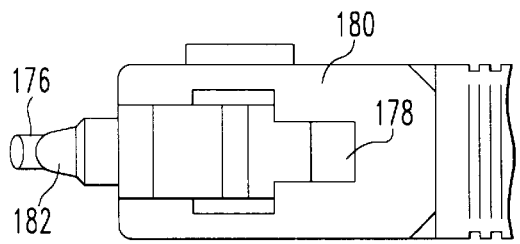
FIG. 21 is a side elevational view of a terminated optical connector which may be adapted for use with the method of the present invention.

FIG. 20 shows a MACII® connector generally at 170 which is essentially similar to the connector shown in FIG. 19 except that it is comprised of two OETC chips 172 and 174. The OETC chip places the fiber on 140 micron centers to fit 32 fibers in the standard MACII® envelope. A polyimide coated fiber which does not have to be stripped is used. The coating for this fiber is available from Spectran under the trade name PYROCOAT. The connector installation on the optical cable is straight forward. The operator removes the cable's outer jacket to the predetermined dimension to expose the strength members and buffered fibers using a knife or stripping tool. The strength members are trimmed to the desired dimension with serrated scissors. The buffer material is stripped within tolerance with the fiber strippers available from Fujikura under the trade name HOT JACKET STRIPPER (part no. HJS-01) It will be appreciated that equivalent chemical stripping methods may also be employed. The bare fiber is cleaned with alcohol to remove impurities that could contaminate the epoxy. Epoxy is inserted into the ferrule with a syringe. In the MACII®, the epoxy is added after the fiber insertion. The spring, insert and coupling device remain clean of epoxy. The fiber is rotated into the ferrule. It finds its way through the ferrule's inner diameter. The ribbon is inserted into the MACII® v-grooves. The buffer material will bottom in the ferrule or block rear while the fiber protrudes from the front endface. A dome of epoxy surrounds and supports the base fiber at the endface protrusion. This dome supports the fiber during the initial grinding and polishing stage. The operator secures the cable to the connector with the strain relief. Strain relief styles vary, but the crimp and epoxy are most used in the connector industry. After the epoxy cures, the operator polishes the fiber to a mirror finish. The polish procedure involves a rough grind to remove the epoxy dome followed by a fine polish to minimize scratches in the glass fiber. The final step includes an endface cleaning to remove contaminates from the polishing process. FIG. 21 shows the terminated optical connector where the connected fiber is at 176 with the front outer shell of the connector 178, the coupling device 180 and the epoxy 182.

Figure 22:
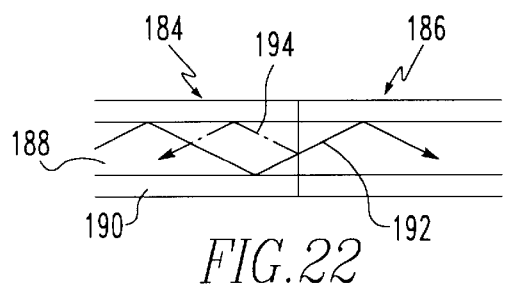
FIG. 22 is a longitudinal cross sectional view of fibers in which an underlying principle of the connector and method of the present invention is schematically illustrated.

Multimode cable assemblies require insertion loss testing, while single-mode cables require insertion loss and backreflection tests. Light reflecting from an interconnection interferes with the laser signals used in single-mode applications. Standards specify various levels of acceptable backreflection measured in loss unit, dB. Referring to FIG. 22 aligned fibers 184 and 186 each having a core as at 188 and cladding as at 190 and carrying a signal 192 are shown. The signals' backreflection component is demonstrated as a dashed ray at 194.

Figure 23:
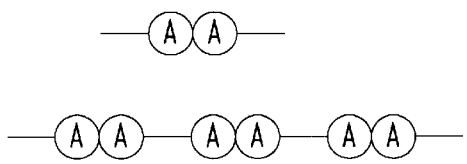
FIGS. 23–34 are schematic illustrations of various test procedures which may be adapted for use with the method of the present invention.
Figure 24:
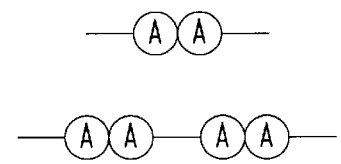
Figure 25:
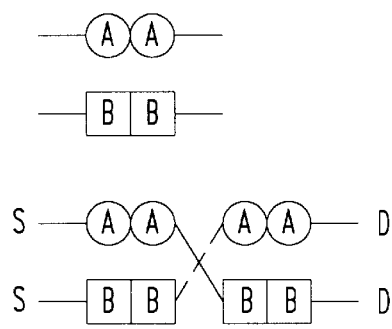
Figure 26:
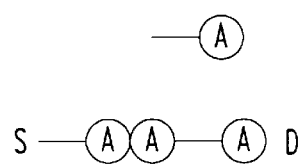
Figure 27:
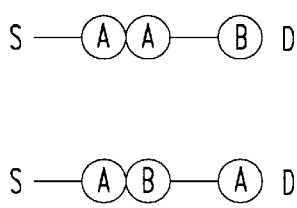

Standard practice tests the optical links prior to installation. This requires comparing the loss of a closed loop with the optical link under test to that of a loop without the link under test. Laser applications most common in single-mode applications may require backreflection tests. A portion of the signal may reflect back into the fiber when a signal encounters the fiber end. The optical industry conventionally tests to the Electronic Industry Association's Fiber Optic Test Procedures (FOTP's). The backreflection tests are conventionally conducted to FOTP-107, Backreflection Measurements for optical fibers. FOTP-171 incorporates four methods to address the major link configurations as listed in Table 2 below. Method A allows the user to test a series individually to mimic a continuous link. Method A limits the test to ten total links. The user would establish a base line with a reference link; cable one would be included in the series. The difference between the reference and cable one determines the loss for cable one. Cable two is added to cable one, and the difference between the measurement of cable two and cable one with the reference determines the loss of cable two. Method A is shown schematically in FIG. 23. Referring to FIG. 24, method B test design measures the loss of like connects. The cable under test is placed between the two reference cables. The user compares the power launched in the loop with and without the cable under test. The operator reverses the cable under test to measure the performance in the opposite direction. The average of the forward and reverse directions yields the cable's attenuation. The cable inverts easily with like connector ends. Referring to FIG. 25, test Method C allows testing unlike connectors, establishing two references with the two types of connectors. The cable under test receives the input from the reference A, but its output leads to connector B. When reversed, connector B becomes the input, and connector A receives the output. The test setup allows the cable to be tested in both directions. Referring to FIG. 26, method D procedure concentrates on a single cable end by placing the opposite end directly into the detector head. The cable under test is placed between the reference and detector unit. The difference between the power of the reference and the reference with the cable under test yields the cable's loss. This procedure allows the user to test pigtails, cables with a single connector end, and trouble shoot problem cables. A problem link with connectors on each end will have the higher loss in the problem connector. If Method B or C fails to detect the loss deviation between the cable ends, Method D may magnify the loss deviation by testing connectors individually. FIG. 27 shows this test procedure schematically.

TABLE 2

| Method | Cable Type |
| --- | --- |
| A | Series |
| B | Like Connectors |
| C | Unlike Connectors |
| D | Single End |

FOTP-107 details the procedure to measure the backreflection characteristics of an optical endface. The procedure requires utilizing an optical coupler, source and power meter. The coupler provides a medium for the operator to compare the power level of the reflected light; however, the optics industry manufactures reliable backreflection meters as alternatives to the manual zeroing method. The backreflection meters eases and expedites the measurements and eliminates additional calculations. The backreflection meter can serve as a power meter when equipped with a power meter module. FIG. 22 illustrates the endface backreflection of an optical signal schematically.

The industrial standards outline various levels of backreflection to meet the user's requirements. Table 3 outlines the various levels of backreflection performance. Though not a standard in the United States, green has been reserved to label angle polish endfaces that yield the lowest backreflection loss. Flat polish techniques result from polishing on glass surfaces. A rubber pad under the polishing surface create a radius on the endface allowing physical contact (PC) of the endfaces. Super physical contact (SPC) and ultra-physical contact (UPC) types are higher control levels of the endface preparation during the polishing process. The angle physical contact (APC) introduces an endface angle to the mating connectors that is located to the connector's key position. The angles vary, 8° to 12° for single fiber connectors among the manufacturers and countries, and 5.5° for the MACII® connector.

TABLE 3

| ENDFACE TYPES AND BACKREFLECTION PERFORMANCE | |
| --- | --- |
| POLISH TYPE | BACKREFLECTION |
| Flat | >20 dB |
| PC | >30 dB |
| SPC | >40 dB |
| UPC | >50 dB |
| APC | >65 dB |

Figure 28:
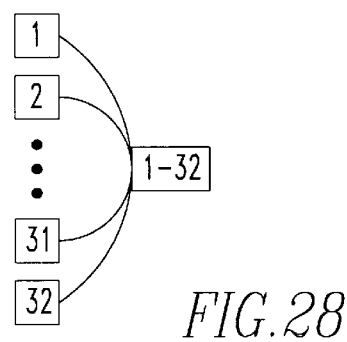
Figure 29:
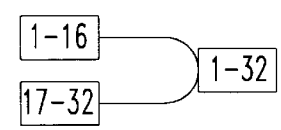
Figure 29:
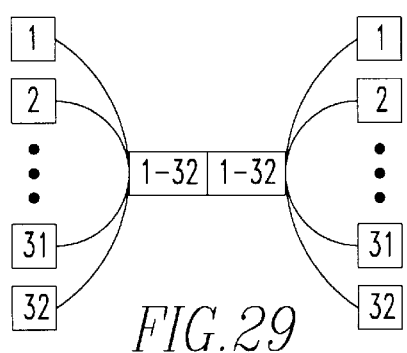
Figure 30:
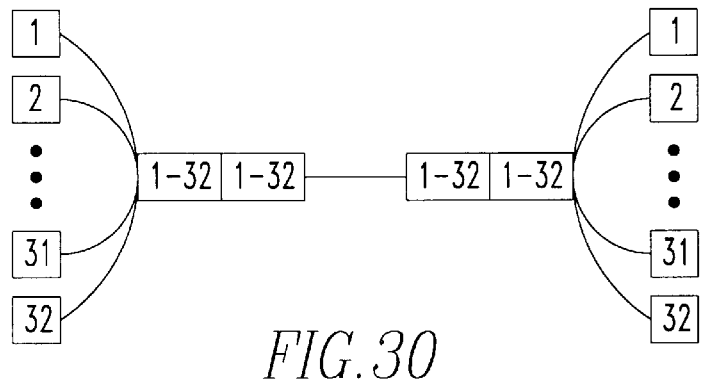

The array connector assemblies utilize the insertion loss (FOTP-171) and backreflection test procedures (FOTP-107) similar to single fiber links. Test techniques allow individual or simultaneous testing the array's individual fibers. Both methods require a reference strap with individual connectors branching into a MACII® assembly which are shown schematically in FIG. 28. The manual method requires a single light source, power meter and two MACII® reference straps. The light launches into an individual merging into the MACII® connector pair branching into a second connector coupled to the power meter are shown schematically in FIG. 29 which shows an array connector baseline with a single source and power meter. The cable under test is placed between the two reference straps as shown schematically in FIG. 30 which shows an array connector baseline with cable under test. The loss measurement includes the reference measurement and the cable under test. The delta of the reference and cable under test yields the cable's loss as stated in Equation 1.

$$\text{Loss (dB)Reference (dBm)} - \\ = \text{Measurement (dBm)} \quad (1)$$

Figure 31:
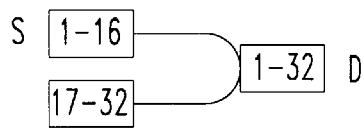
Figure 32:
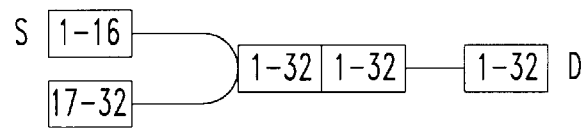
Figure 33:
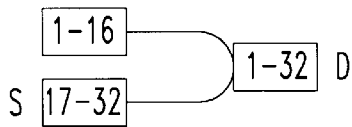
Figure 34:
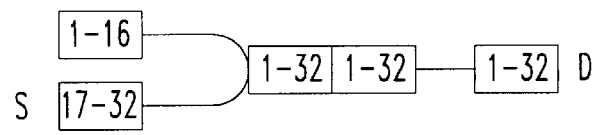

The automatic method utilizes individual sources and detectors for the individual fibers. A computer program steps through the array's fibers measuring the power levels of the references and measurements. The operator simply installs the cable under test between the reference straps and the computer does the remainder of the test including the calculations and data sheets. A different reference strap tests larger quantities greater than the 18 port capacity of the test equipment. This strap splits the quantity into two separate connectors from the 32 fiber connector. The operator will test the first fiber set, 1–16, than channels 17–32 are tested. The test station's software procedures control the calculations to accommodate the various fiber densities. The procedure follows the single fiber test method, except multiple fibers are tested simultaneously. FIG. 31 schematically shows the reference setup for fibers 1–16. The cable under test is placed between the reference strap and the detector head to measure fibers 1–16 as shown schematically in FIG. 32. The difference between reference value and the measurement is the lost for each fiber. The cable is reversed to measure the loss in the opposite direction. The operator alters the reference to measure the performance of the remaining fibers. The reference strap's fibers 17–32 connect to the sources to establish the baseline as seen in FIG. 33. The operator installs the cable under test into the reference setup to measure the loss in fibers 17–32 as illustrated in FIG. 34. The 18 channel computer setup requires two setups when testing cables greater than 18 fibers. Test units are available that provide capacities greater than 18 channels.

Figure 35A:
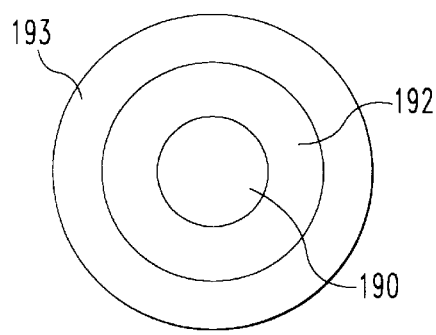
FIGS. 35a and 35b transverse cross sectional views of an optical fiber, which may be used in the connector of the present invention.
Figure 35B:
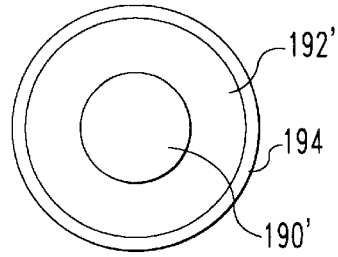

Referring to FIGS. 35a and 35b, optical fibers may be used in the connector of the present invention are shown. In which FIG. 35a shows a conventional optical fiber having a core 190 of a preferred diameter of 0.0625 mm and a cladding 192 of preferred diameter of 0.125 mm with a 0.25 mm buffer 193 which preferably extends to a diameter of 25 mm is shown. It will be understood that the preferred size and number of the grooves in the chips as is disclosed below will be for this size optical fiber.

To obtain the strength of the 250 micron buffered fiber a 135 micron, polyimide coating may be added to the 62.5/125 fiber as shown in FIG. 35b. wherein it will be seen that the fiber includes a core 190 having a preferred diameter of 0.0625 mm, a cladding 192 which preferably extends to a diameter of 0.125 mm and a polyimide coating 194 preferably extends to 0.140 mm. Though the polyimide coating allows the increase of the MACII® density, the polyimide coating will usually increase the fiber cost since the polyimide coated fiber is usually substantially more expensive than the buffered fiber.

Figure 36:
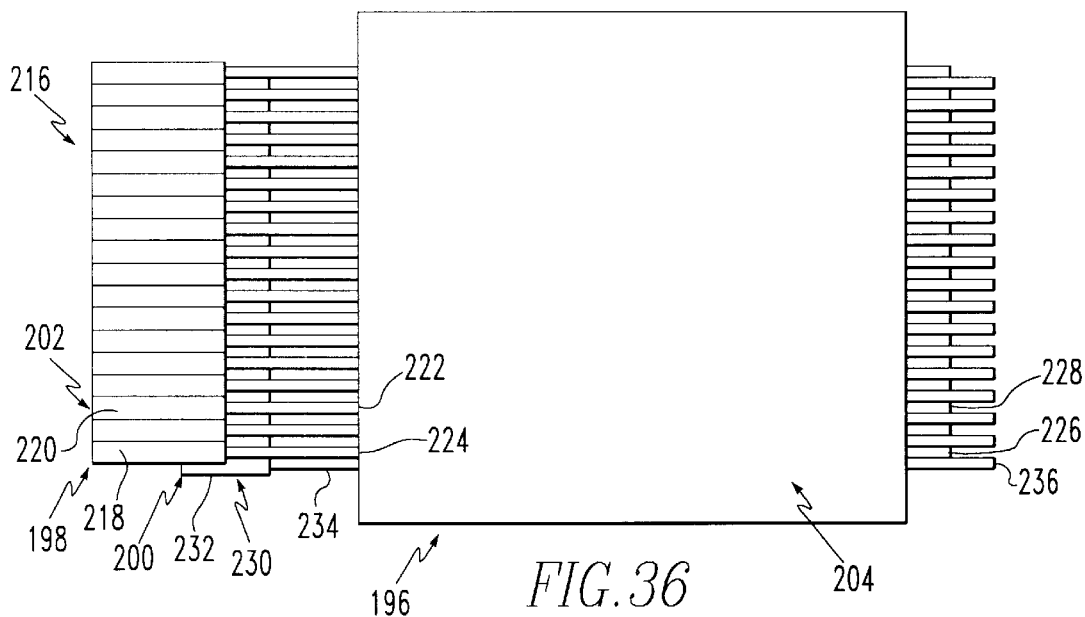
FIG. 36 is a top plan view of a preferred embodiment of the connector of the present invention.
Figure 37:
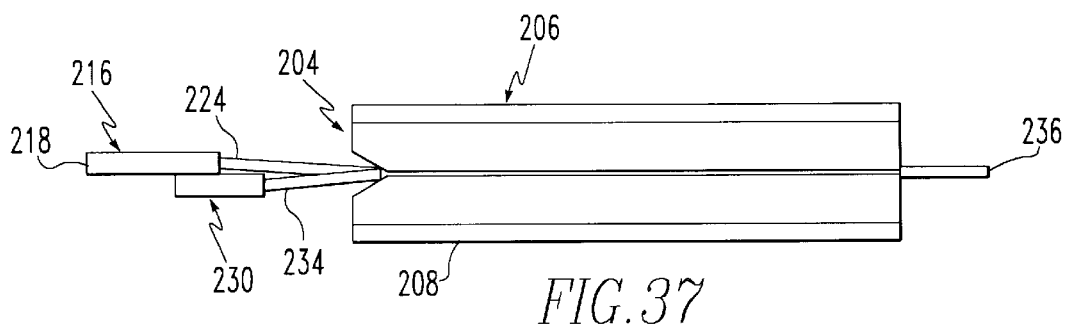
FIG. 37 is a side elevational view of the connector shown in FIG. 36.
Figure 38A:
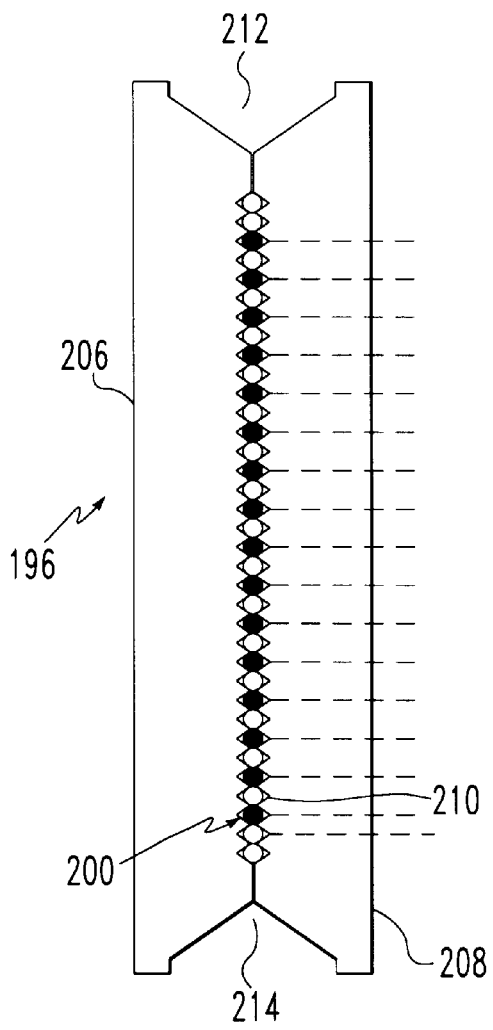
FIG. 38a is an end view of the connector shown in FIG. 36.
Figure 38B:
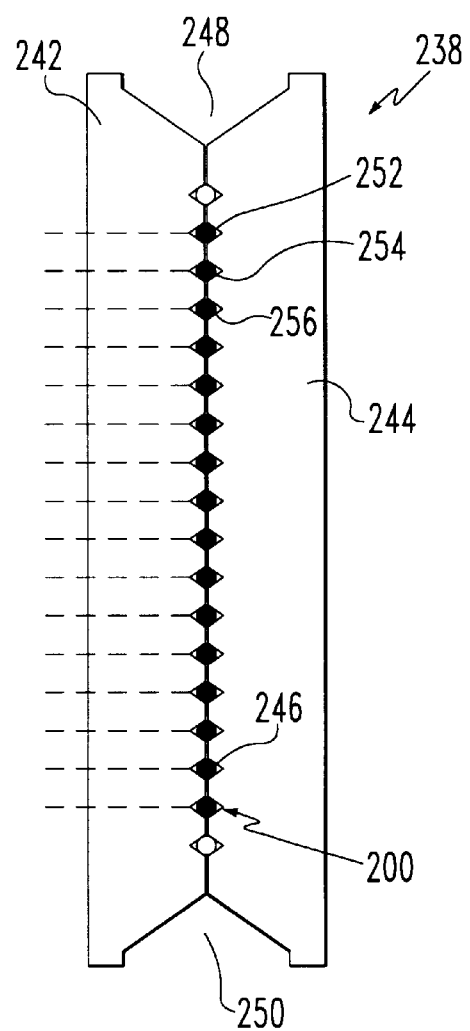
FIG. 38b is an end view of a conventional connector which may be used in conjunction with the connector shown in FIG. 36 in the practice of the method of the present invention.

Referring to FIGS. 36–38a, the connector of the present invention is shown generally at numeral 196. This connector includes a plurality of fibers as, for example, fiber 198, 200 and 202. The connector also includes a block 204 which is comprised of essentially identical chips 206 and 208. The fibers are contained in a plurality of v-grooves as at 210 which are interposed between two end grooves 212 and 214 which contain pins (not shown). When the upper chip is superimposed over the lower chip, the two adjoining v-grooves form axial bores in the resulting block. The fibers 198 and 202 are a part of a fiber ribbon cable 216 which includes insulation as at 218 and 220 around each of the fibers as at 222 and 224. From the opposed side of the connectors there are protruding ends 226 and 228 of these fibers. Ribbon cable 216 is also superimposed over another ribbon cable 230. This ribbon cable also has insulation as at 232 covering each of the fibers as at 234 which extend into the connector from below the cores and ribbon cable 216 to engage one of the v-grooves in the block and extend from the opposed side of the v-groove in a protruding end as at 236. Before the fibers enter the axial bores in the block they are interlaced and in separate vertical planes. Referring to FIG. 38b, it will be appreciated that the connector of the present invention would be adapted for use with a conventional connector which is shown at generally at numeral 238 in FIG. 38b. This conventional connector includes a block 240 which is comprised of two chips 242 and 244 which, have v-grooves as at 246 and end grooves as at 248 to 250 engaging alignment pins (not shown). This connector also includes fibers as at 252, 254 and 256. Referring to FIGS. 38a and 38b together, it will be seen that fibers from connector 196 could be received in connector 238 as is the case with fiber 200. It will also be seen that fibers 252, 254 and 256 in connector 240 would be receivable in connector v-grooves in connectors 196. In the connector in FIGS. 36–38a, the top ribbon center line is preferably offset by 125 microns from the bottom ribbon center line. FIGS. 36 and 37 illustrates the 2×18 array merging into the 1×36 array that enters the chips. Since the two arrays form a single array, the top array fibers are placed in the even positions of the lower chip's grooves while the bottom array fibers are positioned in the lower chip's odd numbered grooves. In FIG. 38a, a 36 Fiber chip illustrates the groove and fiber configurations required to maintain the 18 Fiber chip compatibility. FIG. 38a compares the 36 Fiber chip to the 18 Fiber chip FIG. 38b and illustrates the fiber having required to compatibly use the chips together. For example, the 16 fibers are mated to the 32 fibers, only 16 of the 32 fibers would be active. At a later date, a user can upgrade all components to utilize all 32 fibers. It will also be appreciated that although two ribbon cables are shown in the illustrated embodiment, it would be possible to superimpose one or more additional ribbon cables over these cables to further increase the number of fibers received in the connector.

It will be appreciated that the chips described above may have numerous v-grooves and accommodate numerous fibers. In particular it is contemplated that there would preferably be from 16–36 longitudinal v-grooves per chip which would accomodate 16–36 fibers, and more preferably, there would be 36 v-grooves per chip with 36 fibers accomodated. The v-grooves will preferably be separated from one another by a distance of from 0.124 mm to 0.126 mm at their centerlines and from 0.07 to 0.013 mm at their edges and will have a depth of from 0.050 mm to 0.070 mm. More preferably the grooves will be separated by 125 microns at their centerlines, by 10 microns at their edges and will have a depth of 0.050 mm to 0.070 mm. As is conventional the chips will have a length of about 6.09 mm to about 6.35 mm, a width of about 5.843 mm and a height of about 0.71 mm to about 0.76 mm.

To meet the need for fiber cost reduction and the 125 micron spacing it would also be possible to place 36 fibers on 125 micron centers in the MACII® envelope of this invention. By adding additional fibers between the conventional MACII® 250 micron spacing, current density could be doubled. If the center lines of the two 18 fiber ribbons were offset by 125 microns the 36 stripped fibers would lie in a single dimensional array on 125 micron centers to allow a 2×18 fiber array to be transitional into a 1×36 fiber array.

Referring to FIGS. 36–38a, it will be appreciated by those skilled in the art that the importance of an odd number of grooves, as is particularly shown in FIG. 38a, is that this arrangement allows the lower ribbon having an odd number of fibers to be used to guide the upper ribbon having an even number of fibers into the chip, as is particularly shown in FIG. 36. As a result, the approach angle of the fibers can be more shallow than might be otherwise possible, as is particularly shown in FIG. 37. Sharp bends in the fibers which might induce light loss are thereby avoided.

EXAMPLE

A 2×16 fiber array with two 18 fiber ribbons was made using the 32 fiber chip. The two dimensional array was merged into a single dimensional array on the 140 micron centers (since a 36 Fiber chip was unavailable at this time). To assemble the fibers into the grooves on the 140 centers, the two arrays were fed independently into the chips. After the top array was positioned in the odd grooves of the 32 fiber chips, the bottom fibers were guided by the top fibers into the even grooves.

It will be appreciated that a connector and method has been described which will permit the number of optical fibers to be received in a particular connector to be economically and efficiently increased.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A multifiber array connector for optical fibers comprising:
   (a) a connector block having a plurality of axial bores for receiving optical fibers;
   (b) a first optical fiber ribbon cable comprising a plurality of fibers being insulated over a portion of their length but uninsulated at their terminal ends and extending through the block element in the first set of axial bores; and
   (c) a second optical fiber ribbon cable comprising a plurality of fibers and being insulated over a portion of its length but uninsulated at the terminal end of said fibers and said fibers extending through the second group of axial bores, wherein the block is comprised of a lower chip having an upper and lower surface and having on its upper surface a plurality of longitudinal grooves and an upper chip having an upper and lower surface and having on its lower surface a plurality of longitudinal grooves each of said grooves being positioned to be superimposable over one of said grooves on said lower chip.

2. The connector of claim 1 wherein the first and second group of axial bores are in alternating relation.

3. The connector of claim 1 wherein the grooves are v-shaped.

4. The connector of claim 1 wherein the grooves have center lines and enter lines are spaced by a distance of from about 0.124 mm to about 0.126 mm.

5. The connector of claim 4 wherein the grooves have edges and said edges are spaced by a distance from about 0.007 mm to about 0.013 mm.

6. The connector of claim 4 wherein the grooves have a depth and the depth of said grooves is from about 0.050 mm to about 0.070 mm.

7. The connector of claim 1 wherein each of the chips has a length of about 6.09 mm to about 6.35 mm, a width of about 5.843 mm and a height of about 0.71 mm to about 0.76 mm.

8. The connector of claim 1 wherein each of the chips has about 16 to about 37 longitudinal grooves.

9. The connector of claim 8 wherein there are 37 longitudinal grooves on each of the chips.

10. The connector of claim 1 wherein the chips are silicon.

11. The connector of claim 1 wherein the terminal ends of the fibers of the first ribbon and the terminal ends of the fibers of the second ribbon are interlaced.

12. The connector of claim 1 wherein adjacent the axial bore the terminal ends of each of the fibers are in separate vertical planes.

13. The connector of claim 12 wherein the terminal ends of the fibers each have a diameter which is from 0.120 mm to 0.125 mm.

14. The connector of claim 1 wherein the upper chip and the lower chip are connected with an adhesive.

15. The connector of claim 1 wherein there are an odd number of axial bores and the first optical fiber ribbon cable comprises an odd number of fibers and the second optical fiber ribbon cables comprises an even number of fibers.

16. The connector of claim 1 wherein the first ribbon cable extends obliquely upwardly toward the connector block and the second ribbon cable extends obliquely downwardly toward the connector block.

17. A method of assembling a multifiber array connector for optical fibers comprising the steps of:
   (a) in a first optical fiber ribbon cable comprising a plurality of fibers encased in insulation, removing a portion of said insulation to expose uninsulated terminal ends of said fibers and positioning said uninsulated ends of said terminal ends of said fibers in a first group of longitudinal grooves on an upper surface of a lower chip;
   (b) in a second optical fiber ribbon cable comprising a plurality of fibers encased in insulation, removing a portion of said insulation to expose uninsulated terminal ends of said fibers and positioning said uninsulated ends of said terminal ends of said fibers in a second group of longitudinal grooves on an upper surface of a lower chip;
   (c) positioning an upper chip having a lower surface with a plurality of axial grooves such that said lower surface of said upper chip is superimposed over said upper surface of said lower chip and the grooves on said chips form axial bores in a block comprising said upper and lower chips and said fibers extend through said bores.

18. The method of claim 17 wherein there are from about 16 to about 37 grooves on each of the chips.

19. The method of claim 18 wherein there are 37 longitudinal grooves on each of the chips.

20. The method of claim 17 wherein there are an odd number of axial bores and the first optical fiber ribbon cable comprises an odd number of fibers and the second optical fiber ribbon cables comprises an even number of fibers.

21. The method of claim 20 wherein the first ribbon cable extends obliquely upward toward the connector block and the second ribbon cable extends obliquely downwardly toward the connector block.

22. A silicon chip for use in connecting optical cables having opposed planar sides and on one of said planar sides there are from about 16 to about 37 longitudinal grooves.

23. A multifiber array connector for optical fibers comprising:
   (a) a connector block having a plurality of axial bores for receiving optical fibers;
   (b) a first optical fiber ribbon cable comprising a plurality of fibers being insulated over a portion of their length but uninsulated at their terminal ends and extending through the block element in the first set of axial bores; and
   (c) a second optical fiber ribbon cable comprising a plurality of fibers and being insulated over a portion of its length but uninsulated at the terminal end of said fibers and said fibers extending through the second group of axial bores wherein the first and second group of axial bores are in alternating relation and there are an odd number of axial bores and the first optical fiber ribbon cable comprises an odd number of fibers and the second optical fiber ribbon cables comprises an even number of fibers.

24. The connector of claim 23 wherein the first ribbon cable extends obliquely upwardly toward the connector block and the second ribbon cables extends obliquely downwardly toward the connector block.

* * * * *